May 10, 1966 F. ROTHWARF ETAL 3,250,958

BULK SUPERCONDUCTOR HIGH FIELD PERSISTENT MAGNET AND MEANS FOR MAKING SAME

Filed Sept. 18, 1962

INVENTORS:
FREDERICK ROTHWARF
ROGER C. THIEL
BY S. J. Rotondi,
A. J. Dupont & S. Dubroff
ATTORNEY

United States Patent Office 3,250,958

Patented May 10, 1966

3,250,958

BULK SUPERCONDUCTOR HIGH FIELD PERSISTENT MAGNET AND MEANS FOR MAKING SAME

Frederick Rothwarf and Roger C. Thiel, Philadelphia, Pa., assignors to the United States of America as represented by the Secretary of the Army Filed Sept. 18, 1962, Ser. No. 224,577

2 Claims. (Cl. 317—123)

The invention described herein may be manufactured and used by or for the Government for governmental purposes without the payment to us of any royalty thereon.

This invention relates to superconducting magnets and more particularly concerns such magnets which utilize bulk superconducting materials, and the novel means for inducing high persistent magnetic fields therein.

Prior art superconducting magnets comprised many turns of fine wire made from metallic elements confined to certain regions of the periodic table or from alloys known to be superconductive. The wire was necessarily drawn from a material possessing inherent ductility since finer gauge wires permit a larger number of turns to be confined within a given area and thus effecting a lower current supply requirement to power the magnet.

The winding operation is difficult, often necessitating several miles of wire to be delicately and accurately wound onto a spool. If "kinks" or irregularities should develop in the wire during the winding operation, undesirable resistances will be introduced thereat upon passage of current therethrough to permit the magnet to become normal and thus heat up to such an extent that the liquid helium surrounding the magnet will boil off to provide possible explosions.

Our inventive superconductive magnet comprises, along with associated means to be described hereinafter, a bulk superconductor, preferably in the form of a hollow cylinder, and obviously requires no winding operation. When compared to conventional electromagnets, our inventive device is much lighter in weight, cheaper in cost, can be scaled up or down in size as desired, requires no large electrical rotating machinery for powering or water cooling, suffers no power dissipation in a low temperature environment, has greater field stability and homogeneity than electromagnets and is extremely flexible in design.

It is accordingly a broad object of the present invention to provide a magnet suffering none of the aforementioned disadvantages of the electromagnets.

Another object of the invention is to provide a bulk superconducting magnet devoid of winding operations.

A further object of the present invention is to provide novel means for inducing persistent magnetic currents in a superconducting magnet.

Figure 1:
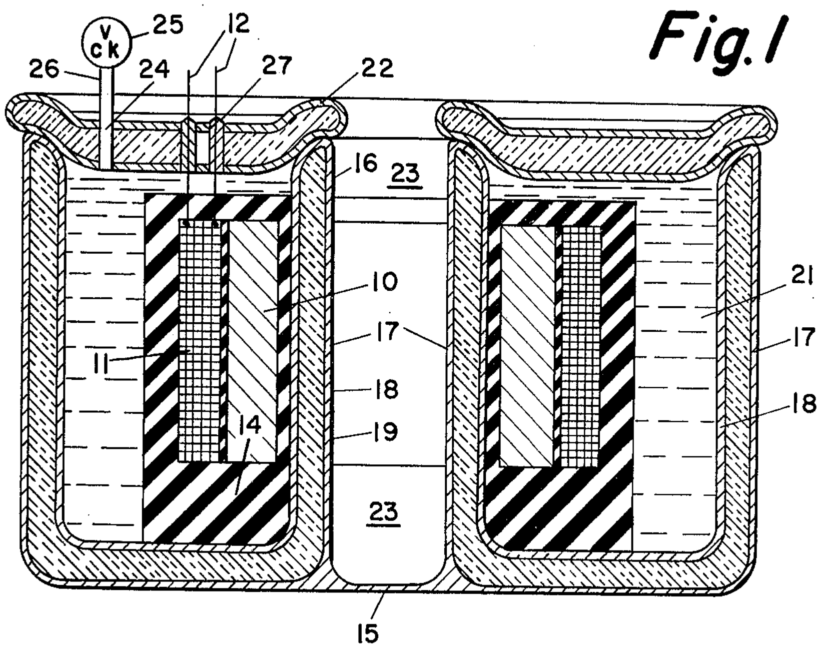
Figure 2:
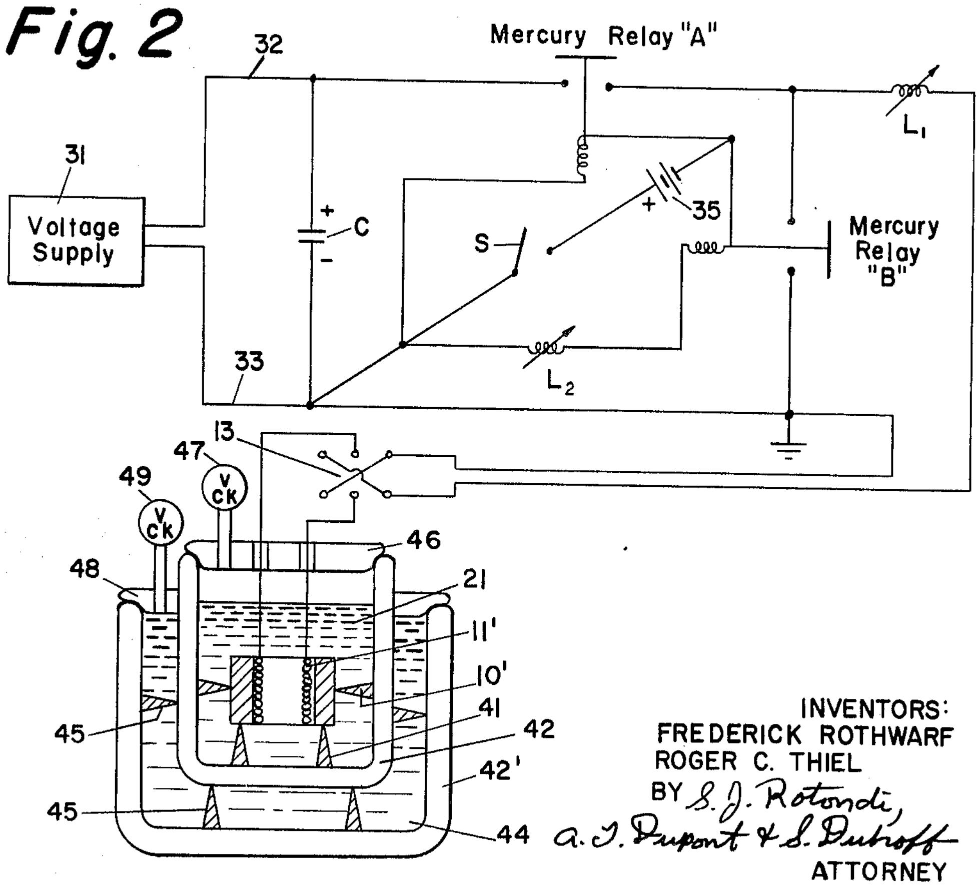

With these and other objects in view, as will hereinafter more fully appear, and which will be more particularly pointed out in the appended claims, reference is now made to the following description taken in connection with the accompanying drawings in which:

FIG. 1 shows a vertical section of an embodiment of our inventive magnet device and auxiliary equipment wherein the pulse coils are external the magnet; and FIG. 2 shows a vertical section of another embodiment of our superconductive magnet device having an internal pulse coil and means schematically illustrated for cooperating therewith.

Referring now to the drawings, there is shown in FIG. 1 a bulk suprconducting material 10 preferably of niobium-tin ($Nb_3Sn$), with a transition temperature approaching about 18° Kelvin, although niobium-zirconium ($Nb_3Zr$, $Nb_2Zr$, $Nb_4Zr$, $NbZr$), vanadium-gallium ($Va_3Ga$), niobium-aluminum ($Nb_3Al$), as examples, and other alloys having lower transition temperatures have remained superconducting in high magnetic fields. The bulk superconductor is illustrated in the form of a hollow cylinder, it being apparent to one skilled in the art that other multiply connected geometrical configurations and sizes are possible. Surrounding the outer wall of the bulk superconductor is a solenoid or insulated coils 11 having lead wires 12 connected to a reversing switch 13 (FIG. 2) and to other electric components to be described more fully hereinafter. The coils and bulk superconductor are encapsulated in a suitable potting compound 14 forming an assembly which is caused to rest within a Dewar container 15 having a central tubular portion 16 such that the assembly is generally concentrically disposed about a portion of the tube 16. The Dewar 15 and tube 16, integral therewith, are provided with thin outer walls 17 and inner walls 18 preferably of stainless steel, and enclose a superinsulating material 19 therebetween, such, for example, as aluminized hollow beads or alternate layers of fiberglass and aluminum foil.

Liquid helium 21 fills the interior of the Dewar and a lid 22 is snugly fitted thereover. It is to be understood, of course that a closed-cycle helium refrigerator can be used to provide the required low temperatures, i.e., about 4° K. The lid is provided with a central opening forming an unconfined air space 23 with tube 16. The lid is further provided with an orifice 24 through which a one-way check valve 25 communicates by means of a pipe 26, an evolving gaseous helium when a predetermined pressure is attained within the Dewar. A pair of openings is similarly provided in the lid to permit passage of the lead wires, the openings being rendered gas impervious by O-ring seals 27, for example, inserted therewithin.

A modification of our superconducting device is illustrated in FIG. 2, wherein a variable high voltage direct current supply 31 charges a capacitor C, polarized as shown, or a capacitor bank, through conductors 32 and 33, the latter leading to ground.

When capacitor C is charged sufficiently, switch S is manually closed to actuate capacitor discharge switch or mercury relay "A" and thus completing a circuit through variable inductor $L_1$ and reversing switch 13 to the pulsing coils or solenoid 11' spaced interiorly of bulk superconductor 10'. Shortly thereafter, crowbar switch or mercury relay "B" is caused to close, the time delay depending on the values given to variable inductor $L_2$ and the inductances offered by the mercury relays, which are actuated by any suitable direct current supply source, as a battery 35, connected therebetween. When mercury relay "B" is closed, the solenoid 11' is effectively "crowbarred" or short circuited and the pulse, in passing through variable inductor $L_1$, is caused to have a decaying tail without voltage undershoot or current reversal thereon which has been found helpful in the production of higher "locked-in" fields in the superconductor. The circuitry shown is merely illustrative of pulse and crowbarring techniques. It is to be understood of course that other more sophisticated circuitry would be suitable. Reduction of the locked-in fields to lower values may be accomplished by pulsing in the reverse direction by reversing the reversing switch and with pulses of suitable amplitude.

The superconductor will be supported laterally and vertically by a convenient support 41, of Teflon, for example, the supports being secured interiorly an inner hollow Dewar 42 which may be stainless steel or glass, or other like material. An outer Dewar 42' of similar material is filled with liquid nitrogen 44 and is spaced from the inner Dewar by supports 45. The inner Dewar is filled with liquid helium 21 and is provided with a gas-tight lid 46 having a one-way check valve 47 for egress of gaseous helium, and is further provided with O-ring seals for gas-tight passage of conductors 32 and 33. The outer Dewar is similarly fitted with a lid and valve 49.

When the coil or solenoid is pulsed upon the discharge of the capacitor, a magnetic field will be produced and concentrated along the axis of the bulk superconductor or hollow cylinder in the coil configuration of FIG. 1 or FIG. 2 and thereby inducing a current in the superconductor. By proper selection of values, crowbar switch or mercury relay "B" will close at the peak of the discharge pulse to produce a long decaying tail on the pulse. As the field decreases on the tail portion of the pulse, the magnetic flux is not expelled from the bulk superconductor but stays therein and remains strongly magnetized in zero field. This procedure may be repeated as often as necessary or desired, or by pulse of successively lesser magnitude until a large persistent current is locked in the hollow bulk superconductor. In essence, our bulk superconductive device is a one turn solenoid which is capable of carrying large currents, i.e., approximately $2\times10^5$ amps./cm.$^2$.

In the fabrication of our hollow superconductor, the niobium and tin powders, in the proportion of $Nb_3Sn$, are mixed and pressed at high pressures in dies and machined to desired size and geometry. They are then sintered in vacuo at suitable temperatures to form the final alloy. Of course, other superconductive alloys may be fabricated similarly by using the above powder metallurgical techniques.

It is apparent from the foreging description that we have provided a superconducting magnet which comprises a bulk superconductor along with associated means as aforedescribed, the bulk superconductor itself requiring no winding operation with its concomitant difficulties. The superconducting magnet thus formed is capable of remaining in that state in extremely high magnetic fields and of carrying persistent currents of high magnitude. Its application should find widespread use as a basic research tool in solid state and plasma physics, in Maser oscillators and amplifiers, in adiabatic demagnetization experiments, in magneta-hydrodynamic energy converters for obtaining electric energy directly from hot ionized gases, in obtaining suitable magnetic field configurations for hydrogen fusion reactions, in superconducting bearings and motors and the like.

We claim:

1. A device for locking in persistent currents in a bulk insulated liquid helium filled Dewar for containing said material, a pulse coil axially adjacent the material, means for applying pulses to said coil comprising a high variable direct current source and a capacitor in parallel thereacross, a capacitor discharge switch connected to a positive side of said capacitor and its negative side leading to ground, a constant direct current supply, a manual switch cooperating with the constant direct current supply and said discharge switch for permitting discharge thereof, a first variable inductor and a crowbar switch serially connected across the constant direct current supply and manual switch, said crowbar switch being actuated in delayed relation to said capacitor discharge switch, a reversing switch connected to said pulse coil and a second variable inductor interposed between the capacitor discharge switch and said reversing switch.

2. The device of claim 1 further characterized by said pulse coil comprising a plurality of turns of an insulated electric conductor axially wound around said bulk superconducting material, electrical insulating material encapsulating said pulse coil and bulk superconducting material forming an assembly, a thermally insulated liquid helium filled Dewar for containing said assembly, a gastight cover for said Dewar, said cover having a pressure-escape means disposed therein, a pair of grommeted orifices in said cover, an electric conductor in each of said grommeted orifices communicating with said pulse coil and said reversing switch.

References Cited by the Examiner

UNITED STATES PATENTS

| | | | |
|---|---|---|---|
| 2,836,787 | 5/1958 | Seider | 307—108 X |
| 2,913,881 | 11/1959 | Garwin. | |
| 3,048,707 | 8/1962 | Nyberg. | |
| 3,098,181 | 7/1963 | Cioffi | 317—201 X |
| 3,129,359 | 4/1964 | Kunzler | 317—123 X |
| 3,156,850 | 11/1964 | Walters | 317—123 |
| 3,158,792 | 11/1964 | Swartz et al. | 317—158 |

OTHER REFERENCES

Hildebrandt et al.: Journal of Applied Physics, vol. 33, No. 7, July 1962, ". . . Multiply Connected Superconductors," pp. 2375–2377.

Aron et al.: Journal of Applied Physics, vol. 33 No. 7, July 1962, "Critical Currents of Superconducting Nb 25 at. Percent Zr in High Magnetic Fields," pp. 2242–2244.

Mammel et al.: Journal of Applied Physics, vol. 33, No. 7, July 1962, "Maximum Field of Magnetized Disks and Cylinders," page 2244.

MILTON O. HIRSHFIELD, *Primary Examiner.*

SAMUEL BERNSTEIN, *Examiner.*

D. YUSKO, L. T. HIX, *Assistant Examiners.*